(12) United States Patent
Polivka

(10) Patent No.: US 12,104,033 B2
(45) Date of Patent: Oct. 1, 2024

(54) PLANT GROWTH SYSTEM AND MEDIUM

(71) Applicant: Growpito Technologies, LLC, Kansas City, MO (US)

(72) Inventor: David G. Polivka, Kansas City, MO (US)

(73) Assignee: Growpito International Company, LLC, Kansas City, MO (US)

( * ) Notice: Subject to any disclaimer, the term of this patent is extended or adjusted under 35 U.S.C. 154(b) by 0 days.

(21) Appl. No.: 15/249,313

(22) Filed: Aug. 26, 2016

(65) Prior Publication Data

US 2017/0055470 A1   Mar. 2, 2017

Related U.S. Application Data

(60) Provisional application No. 62/210,063, filed on Aug. 26, 2015.

(51) Int. Cl.
| | |
|---|---|
| *A01G 31/00* | (2018.01) |
| *A01G 24/18* | (2018.01) |
| *A01G 24/30* | (2018.01) |
| *A01G 24/48* | (2018.01) |
| *A01G 31/02* | (2006.01) |
| *C05F 11/08* | (2006.01) |
| *C08J 9/00* | (2006.01) |
| *A01G 27/00* | (2006.01) |

(52) U.S. Cl.
CPC ............ *C08J 9/0085* (2013.01); *A01G 24/18* (2018.02); *A01G 24/30* (2018.02); *A01G 24/48* (2018.02); *A01G 31/00* (2013.01); *A01G 31/02* (2013.01); *C05F 11/08* (2013.01); *A01G 27/001* (2013.01); *A01G 2031/006* (2013.01); *C08J 2375/04* (2013.01)

(58) Field of Classification Search
CPC ................................ A01G 31/00; A01G 31/02
USPC ................................ 47/59 R, 59 S, 62 N, 64
See application file for complete search history.

(56) References Cited

U.S. PATENT DOCUMENTS

| | | | |
|---|---|---|---|
| 4,404,013 A | 9/1983 | Rainbow | |
| 4,552,844 A | 11/1985 | Everett | |
| 4,746,349 A | 5/1988 | Becker | |
| 4,906,273 A | 3/1990 | Wright | |
| 4,927,455 A | 5/1990 | Hotta et al. | |
| 5,009,030 A * | 4/1991 | Kafka | A01G 24/00 47/64 |
| 5,099,605 A * | 3/1992 | Moffet, Jr. | A01G 24/00 47/59 R |
| 5,728,192 A | 3/1998 | Andrew, Jr. | |
| 5,867,937 A | 2/1999 | Templeton | |
| 6,189,260 B1 * | 2/2001 | Kusey | C05F 5/002 47/9 |

(Continued)

*Primary Examiner* — David J Parsley
(74) *Attorney, Agent, or Firm* — POLSINELLI PC

(57) ABSTRACT

A plant growth system and medium employs a manmade mineral fiber-based growth medium that includes from about 40% to about 99.5% man-made mineral fiber interspersed with from about 0.5% to about 60% by weight pieces of natural or synthetic open cell foam. The foam includes from about 5 to about 50 pores per square inch. Additives in the form of nutrients, fungi, and bacteria are included. Water is supplied to plants by flood and drain watering during plant growth in the medium. EC is maintained within a range of about 0.5 mS/cm to about 2.500 mS/cm and pH is maintained within a range of about 5.6 to about 5.8.

17 Claims, 1 Drawing Sheet

| WATER SYSTEM/ SOLUTION USAGE | | | | | | | | | | | | | SOLUTION SUPPLIED/ LOST |
|---|---|---|---|---|---|---|---|---|---|---|---|---|---|
| Week of Growth Cycle | 1 | 2 | 3 | 4 | 5 | 6 | 7 | 8 | 9 | 10 | 11 | 12 | |
| Novel Plant Growth System | | | | | | | | | | | | | |
| Solution supplied per plant (gals) | 12 | 6 | 6 | 6 | 6 | 6 | 6 | 6 | 6 | 6 | 6 | 6 | 78 gallons supplied |
| Solution loss/waste (gals) | | | | | | | | | | | 6 | | 6 gallons lost |
| Conventional Recirculating Deep Water Plant Culture | | | | | | | | | | | | | |
| Solution supplied per plant(gals) | 50 | 50 | 50 | 50 | 50 | 50 | 50 | 50 | 50 | 50 | 50 | 50 | 600 gallons supplied |
| Solution loss/waste (gals) | | 50 | 50 | 50 | 50 | 50 | 50 | 50 | 50 | 50 | 50 | 50 | 550 gallons lost |

(56) References Cited

U.S. PATENT DOCUMENTS

| | | | |
|---|---|---|---|
| 6,488,732 B2 | 12/2002 | Scanlan | |
| 6,615,539 B1 * | 9/2003 | Obonai | A01G 24/35 |
| | | | 47/62 N |
| 7,060,656 B2 | 6/2006 | Kato et al. | |
| 7,399,730 B2 | 7/2008 | Kostka et al. | |
| 8,034,147 B2 | 10/2011 | Vempati et al. | |
| 8,381,439 B2 * | 2/2013 | Rubin | A01C 1/04 |
| | | | 47/59 S |
| 8,458,955 B2 | 6/2013 | Larsen | |
| 8,516,741 B2 | 8/2013 | Singletary | |
| 8,782,949 B2 | 7/2014 | Singletary | |
| 8,984,805 B2 | 3/2015 | Shpak et al. | |
| 9,045,379 B2 | 6/2015 | Nelson et al. | |
| 2009/0293350 A1 * | 12/2009 | Kania | A01G 9/023 |
| | | | 47/29.1 |
| 2011/0094154 A1 * | 4/2011 | Joaquin | A01G 27/06 |
| | | | 47/65.8 |
| 2013/0283688 A1 * | 10/2013 | Naerum | A01G 24/00 |
| | | | 47/59 S |
| 2014/0259915 A1 * | 9/2014 | Eiben | A01G 20/20 |
| | | | 47/65.9 |
| 2015/0373935 A1 * | 12/2015 | Anderson | A01G 31/02 |
| | | | 47/63 |

\* cited by examiner

| WATER SYSTEM/ SOLUTION USAGE | | | | | | | | | | | | | SOLUTION SUPPLIED/ LOST |
|---|---|---|---|---|---|---|---|---|---|---|---|---|---|
| Week of Growth Cycle | 1 | 2 | 3 | 4 | 5 | 6 | 7 | 8 | 9 | 10 | 11 | 12 | |
| | | | | | | | | | | | | | |
| Novel Plant Growth System | | | | | | | | | | | | | |
| Solution supplied per plant (gals) | 12 | 6 | 6 | 6 | 6 | 6 | 6 | 6 | 6 | 6 | 6 | 6 | 78 gallons supplied |
| Solution loss/waste (gals) | | | | | | | | | | | | 6 | 6 gallons lost |
| Conventional Recirculating Deep Water Plant Culture | | | | | | | | | | | | | |
| Solution supplied per plant(gals) | 50 | 50 | 50 | 50 | 50 | 50 | 50 | 50 | 50 | 50 | 50 | 50 | 600 gallons supplied |
| Solution loss/waste (gals) | | 50 | 50 | 50 | 50 | 50 | 50 | 50 | 50 | 50 | 50 | 50 | 550 gallons lost |

PLANT GROWTH SYSTEM AND MEDIUM

FIELD

The present disclosure generally relates to a system and method for enhancing the productivity of plant husbandry. More particularly, it is directed to an improved plant growth system employing a growth medium prepared from manmade mineral fibers and foam and a method of use.

BACKGROUND

Most known plant growth media are soil or rock-based. Typically, the medium must be disposed and replaced after one or a few uses. Such media also utilize considerable amounts of water, resulting in substantial water waste and loss of nutrients. In some geographic areas, these systems have become difficult to maintain in the face of aquifer depletion and weather-related water shortages. All of these factors have contributed to increased costs for supply and disposal of both growth media and water. In addition, these systems are particularly prone to contamination by insects, bacteria, mold, fungus, and other biological contaminants that further increase the costs of production and may also render the plant products unusable. Drip leads in such media environments tend to clog and deliver inconsistent amounts of water and nutrients to the individual plants.

Some hydroponic systems do not employ rock or soil-based grown media. For example, deep water culture, nutrient film technique, and aeroponic culture grow plants directly in water, in a flow of water, or in air misted with water. Deep water culture, however, is water intensive and not suitable for large or long term plants. Nutrient film technique and aeroponic culture are subject to rapid catastrophic failure when roots dry out during temporary power outages and pump failures.

Other hydroponic systems, such as the wick system, drip systems and ebb and flow/flood and drain, employ growth media that are soil or rock-based, and so share the problem of contamination and the burden of disposal. In addition to these problems, the wick system is unsuitable for large or water-loving plants; drip systems are subject to clogged drip lines; and ebb and flow systems are subject to root drying during power outages or pump and timer failures.

Accordingly, there is a need for a plant growth system and medium that is repeatedly reusable, that reduces the requirements for water, light, and nutrients, that provides better plant yield for the grower, and that reduces biological contamination.

SUMMARY

The present disclosure provides a greatly improved plant growth system and medium for enhancing the productivity of plant horticulture. The system employs a flood and drain or ebb and flow type watering system with a man-made mineral fiber-based growth medium that includes quantities of man-made mineral fiber interspersed substantially uniformly with pieces of a natural or synthetic foam having an open cell structure. In one embodiment, rock wool and reticulated aquatic filtering foam are employed. Additives may also be included to enhance the plant growth environment and provide air space for the roots. In one embodiment, fungi are included. In another embodiment, Mycorrhizal fungi are included. In other embodiments, inorganic compounds are included. In still other embodiments, materials containing organic compounds and enzymes are included.

Various objects, features and advantages of this disclosure will become apparent from the following detailed description, which, taken in conjunction with the accompanying drawings, which depict, by way of illustration and example, certain embodiments of this plant growth system.

The drawings constitute a part of this specification, include exemplary embodiments of the plant growth system, and illustrate various objects and features thereof.

BRIEF DESCRIPTION OF THE DRAWINGS

FIG. 1 is a table illustrating comparative water usage during an exemplary 12 week plant growth cycle of a plant growth system in accordance with the disclosure as compared with a recirculating deep water culture system.

DETAILED DESCRIPTION

A plant growth system and medium in accordance with the present disclosure employs a flood and drain system with a substrate that includes quantities of one or more manmade mineral fiber and quantities of one or more open cell natural or synthetic foams. The foams are provided in pieces that are interspersed substantially uniformly with the mineral fiber. Quantities of additives including fungi such as micorrhiza, bacteria, enzymes, inorganic compounds, organic materials, and organic compounds, may also be included.

The system and growth medium may employ any suitable man-made mineral fiber (MMMF), or man-made vitreous fiber (MMVF), or synthetic vitreous fiber (SVF). For purposes of this disclosure, the terms and their abbreviations MMMF, MMVF and SVF are used interchangeably as generic terms to describe a man-made fiber material manufactured primarily from natural rock or stone, mineral ores, clay, minerals, slag, ceramic, glass, and/or processed inorganic oxides. The fibers are generally manufactured by blowing air or steam through such material in its molten state, or by high speed spinning or attenuating of the molten material to form a mass of fibers. Such manufactured fibers include so-called "rock wool", "stone wool", "slag wool", refractory (i.e., stable at high temperatures) ceramic fiber or aluminum silicate fiber, continuous glass filament fibers, glass wool or fiberglass, and special purpose fibers.

In one embodiment, rock wool mineral fiber is employed. Rock wool may be manufactured from one or a combination of aluminosilicate mineral matter, industrial slag, limestone, and/or dolomite. The aluminosilicate mineral matter may be obtained from rock, stone, or ore, including, but not limited to, basalt, and diabase or dolerite. The industrial slag may be obtained from blast furnaces or casting plants, or any other industrial processes yielding a mixture of metal oxides and other byproducts. These components generally also include quantities of one or more of any of a wide variety of common minerals, including, but not limited to, silicone dioxide or quartz.

One embodiment of a mineral fiber in accordance with the present disclosure is manufactured from slag. Slag may be obtained from a variety of sources, including the production silomanganese (SiMn). One exemplary source of SiMn slag is ERAMET™ (France). This SiMn slag includes quantities of silicon dioxide, alumina, calcium oxide, manganese oxide, magnesium oxide, barium oxide, potassium oxide and iron oxide. Another exemplary source of SiMn Slag is Felman Production, Inc. (United States). This SiMn slag includes quantities of silicon oxide, calcium oxide, manganese oxide, magnesium oxide, aluminum oxide, iron oxide, potassium oxide, and barium oxide. The slag is formed into mineral fiber (slag wool fiber) as previously described and is then prilled or granulated to reduce the length of the fibers. This MMMF embodiment includes no added binders and has good capacity to hold and retain water.

A second embodiment of a mineral fiber in accordance with the present disclosure is manufactured from basalt and crystalline silicone dioxide into fibers which are prilled or granulated to reduce fiber length. An exemplary source of such fiber is ROLAN® (Mexico). The fibers include quantities of calcium oxide, silicon dioxide, aluminum oxide, iron oxide, magnesium oxide, sulfur and a binder including phenolic resin and urea.

A third embodiment of a mineral fiber in accordance with the present disclosure is a slag wool fiber. The fibers include quantities of silicon dioxide, calcium oxide, aluminum oxide, magnesium oxide, iron oxide, titanium dioxide, potassium oxide, sulfur, manganese oxide, sodium oxide, chlorine and fluorine with no added binders. An exemplary source of such fiber is Thermafiber®, Inc., a division of Owens Corning® (United States). Those skilled in the art will appreciate that any suitable MMMF or combination of MMMFs may be employed with or without binders, and that the MMMF may or may not be prilled or granulated.

The growth medium also includes an open cell foam material that serves to filter water and also provides surfaces for colonization by bacteria. The foam material may include a reticulated or non-woven, open cell foam having high porosity, large surface area, and low density. In one embodiment, the foam material may be man-made, in which the solid component of the reticulated foam may be an organic polymer such as polyurethane, polyether, or polyester, or any other suitable polymer, a ceramic, or a metal. In another embodiment, the foam may be naturally occurring. Naturally occurring foam may be obtained from marine sponges, plants such as those of the Cucurbitaceae family (luffa) or hemp, starches, or natural latex. Any suitable foam material that provides the same effect may also be employed. In one preferred embodiment, reticulated polyurethane aquatic filtering foam is employed.

The foam material has from about 5 to about 50 openings or pores per square inch. Another preferred foam material has from about 10 to about 40 pores per square inch. Another preferred foam material has from about 20 to about 30 pores per square inch. Another preferred open cell foam has about 25 pores per square inch. Another preferred open cell foam has about 20 pores per square inch.

The foam material may be cut or ground from a block or sheet into pieces having various sizes, from fine particles to larger sizes, depending on the needs of the plants. The foam material may include pieces that are irregular in shape as well as pieces having defined shapes such as squares, cubes, or rectangles measuring from about ¼ inches on a side to about 1¼ inches on a side. One exemplary foam material measures ¼ inches on a side. Another exemplary foam material measures about ⅜ inches on one side. Another exemplary foam material measures about ½ inches on one side. Another exemplary foam material measures about ¾ inches on one side. Another exemplary foam material measures about 1 inch on one side. Another exemplary foam material measures about 1¼ inches on one side. One exemplary foam material includes a combination of irregular-shaped foam pieces and foam pieces having regular shapes including about ¼ inches on one side, about ½ inches on one side, ⅜ inches on one side, ½ inch on one side, ¾ inches on one side, 1 inch on one side and 1¼ inches on one side and regular foam pieces having combinations of the foregoing sizes of sides. Any suitable natural or man-made open celled foam material or combination of materials in any suitable size, shape, or combination may be employed. The composition of the foam material as well as the sizes, shapes, and mixture of the pieces is determined in accordance with the nature and characteristics of the particular plants to be grown.

Additives may be added to the growth medium, such as fungi, bacteria, enzymes, and mixtures thereof. The foam pieces interspersed throughout the growth medium provide a platform for colonization by fungi and beneficial bacteria. While any suitable fungus or mixture of fungi may be employed, culturable fungi are particularly well-suited for use. In one embodiment endomycorrhizal fungi, ectomycorrhizal fungi, or combinations are employed as additives to form symbiotic associations of the fungus with the roots of a vascular plant to be grown. Suitable endomycorrhizal fungi include, but are not limited to, members of the genus *Glomus*, including, but not limited to, *Glomus mosseae, Glomus intraradices, Glomus claroidium, Glomus etunicatum, Glomus clarum, Glomus deserticola*, and *Glomus microaggregatum*. In another embodiment fungi of the genus *Trichoderma* are employed as an additive. Suitable *Trichderma* species include, but are not limited to, *T. hamatum, T. harzianuom, T. viride* and *T. reesei*. Beneficial bacterial additives foster a humid environment which encourages the plant roots to penetrate the open cell foam and branch out. Beneficial bacteria and enzymes digest dead root matter such as hair roots, cleaning the roots and reducing the chance of root rot and other diseases. This process produces waste, which adds additional nutrient value to the growth medium. The breakdown of old root mass also stimulates the growth of new hair roots, leading to an increase in the overall root mass of the plant. Any suitable beneficial bacterium or mixture of bacteria may be employed. In one embodiment, nitrogen fixing bacteria are employed as additives. One additive embodiment includes bacteria of the genus *Bacillus*. Suitable *Bacilli* include, but are not limited to, *B. megaterium, B. subtilis, B. amyloliquefaciens, B. azotoformans, B. licheniformis, B. pumilus, B. firmus, B. coagulans, Geobacillus stearothermophilus*. Other suitable bacteria include, but are not limited to *Paenibacillus polymyxa, Paenibacillus durum*, bacteria of the genus *Pseudomonas*, including but not limited to, *P. putida, P. florescens, P. aureofaciens*, bacteria of the genus *Streptomyces*, including but not limited to *S. lydicus, S. griseus*, and *S. coelicolor*. Any suitable horticultural enzyme or mixture of enzymes may also be included.

Other additives may include inorganic compositions such as ammonium nitrate, ammonium sulfate, calcium, magnesium, magnesium sulfate, potassium chloride, or triple superphosphate (monocalcium phosphate or calcium dihydrogen phosphate), magnesium sulfate, or combinations thereof.

Other additives may include naturally occurring materials and materials derived from naturally occurring materials that contain organic and/or inorganic compositions, such as alfalfa, ash, blood meal, bone meal, charcoal, chelating agents, chicken manure, compost, cover crops, dolomite, fish emulsion, fish meal, humic acid, sea kelp, manure, plant extracts, including but not limited to yucca plant extract, rock phosphate, raw langbeinite, rockdust, sawdust, unprocessed natural potassium sulfate, wood chips, vegetation nutrients, water soluble vitamins, or any combination thereof. The additives are preferably stable and degradation-resistant and have a low rate of outgassing or offgassing.

The growth medium is prepared by providing quantities of MMMF and foam material and mixing them together in optimal proportions for a selected plant to be grown in the medium. In one embodiment, the growth medium admixture includes from about 40% to about 99.5% MMMF, preferably from about 70% to about 98% MMMF and from about 0.5% to about 60% foam material pieces by weight, preferably from about 2% to about 30% foam material pieces by weight. In another embodiment, the growth medium includes from about ¼ pound foam material pieces per 10 pounds of MMMF to about 2 pounds foam material pieces per 10 pounds of MMMF. The MMMF and foam medium may be pre-loaded with additives that serve as plant nutrients and/or other growth-enhancing compositions before use. In one embodiment, the medium includes less than 1% by weight of each additive. The MMMF, foam, and any other selected additives are chosen and mixed in optimal proportions to create a growth medium having enhanced airflow, beneficial bacteria and fungi and enzymes for a selected plant to be grown in the medium. In one embodiment, certain additives are be added to the growth medium later, at times determined to optimize growth of the selected plants. In one embodiment, fungi and bacteria are added to the growth medium later.

The growth medium admixture is pretreated before use by soaking in an aqueous nutrient solution. A preferred water-nutrient solution is prepared with reverse osmosis-filtered water and includes quantities of nitrogen, phosphate, potassium, and calcium. Another preferred water-nutrient solution also includes magnesium, zinc, and iron and a chelator. Another preferred nutrient solution includes additives which may include fungi, bacteria, and enzymes and mixtures thereof. One preferred additive includes a mixture of mychorrhizal fungi. Another preferred additive includes fungi of the genus *Trichoderma, Gliocladium, Penicillium*, and mixtures thereof. Another preferred additive includes mixtures of species of *rhizobacteria*. One preferred additive includes mixtures of *pseudomonas* and *bacillus* bacteria. One preferred additive includes mixtures of enzymes and amino acids.

The pH of the nutrient solution is adjusted to within a range of from about 4.0 to about 8.0, with a preferred range of about 5.5 to about 6.0, and a particularly preferred range of from about 5.6 to about 5.8. The electrical conductivity (EC) is adjusted by addition of nutrients to within a range of from about 0.500 mS/cm to about 3.500 mS/cm, with a preferred range of about 0.500 mS/cm to about 2.500 mS/cm, and a particularly preferred range of 1.000 mS/cm to about 1.200 mS/cm depending on the plants to be grown in the medium. Because reverse osmosis-filtered water has an EC of 0.000, the preceding EC values reflect only electrical conductivity attributable to the nutrients added to the water. If the EC of the water prior to addition of nutrients exceeds 0.000, then the target EC values must be adjusted accordingly by adding the EC value of the water.

After soaking for at least about 24 hours, the growth medium is drained by gravity, pump, or centrifuge. The material is then fluffed before placement in containers and planted with cuttings or seedlings. The pots are then watered with an aqueous solution of enzymes with the pH adjusted to about 5.6. A sufficient quantity of the solution is added to the base of the plant at the stem to form a column to the bottom of the pot so that it drains out. The pots are placed in a tray. After the pots lose weight, in about 3-10 days, depending on the size of the pot and the nature of the plant, the tray is flooded with the nutrient solution. The tray is flooded to a height of from about 10% to about 50% of the height of the medium in the pot, preferably from about 15% to about 40%, preferably from about 20% to about 30% and most preferably to a height of about 25% of the height of the medium in the pot. The height of flooding is adjusted in accordance with the size and shape of the pot and the quantity of medium in the pot.

The pots are drained completely. When the plants have absorbed the solution, the pots may appear to have lost weight. This occurs in about 2 days to about 5 days, preferably in about 3 days, depending on the size of the pot and before wilting, the pots are flooded with the aqueous nutrient mixture as described.

Following each watering or flood and drain cycle, the solution is recovered as it is drained and the EC and pH are measured. Preferably, the EC and pH of the returned solution will be very close to the original values. If the EC is elevated, adjustments are made to lower EC in the reservoir solution by addition of water. If the EC is less than the pre-flood value, adjustments are made to increase EC in the reservoir solution by addition of nutrients. If necessary, pH can be adjusted with an acid such as phosphoric acid or a base. The flood and drain cycle can continue as described on a cycle of from every 2 days to every 30 days depending on the growth medium, the nature of the plant, and the ambient temperature. While a nutrient mixture has been described, it is foreseen that the nutrient mixture will be adjusted to meet the requirements of the particular plants that are grown. Growth results typically indicate how the plant has reacted to the applied nutrient solution.

The described flood and drain watering method used to supply water to the plants during growth in the medium includes monitoring of all water and nutrient solutions at supply and recovery for complete control of the pH and the electrical conductivity (EC) of every watering phase throughout the growing cycles. Because the disclosed system recycles its water, the system uses and wastes substantially less water, resulting in substantially reduced water costs. As shown in FIG. 1, the plant growth system supplies substantially less water (78 gallons) than a conventional recirculating deep water culture system (600 gallons) for the same number of plants during a 12 week growth cycle. Total water loss of the disclosed system is 6 gallons, or 0.077% of the total water supplied, while total water loss of the conventional recirculating deep water culture system is 550 gallons, or 91.67% of the total water supplied. The growth medium is inert and is easily used with both organic and inorganic nutrients. The disclosed flood and drain system does not require drip leads, which are subject to clogging, thereby ensuring that each plant receives the proper nutrients and water throughout its life cycle.

EXAMPLE I

A plant growth medium for tomatoes was prepared by admixing 90% MMMF by weight with 10% reticulated polyurethane biofoam by weight to form a substantially uniform interspersion of the foam material and the MMMF. Slag wool MMMF was obtained from Thermafiber®, Inc. Analysis showed 41.92% silicon dioxide, 31.07% calcium oxide, 11.21% aluminum oxide, 9.99% magnesium oxide, 2.80% iron oxide, 0.72% titanium dioxide, 0.71% potassium oxide, 0.51% sulfur, 0.47% TC anionic surfactant, 0.43% manganese oxide, 0.19% sodium oxide with 61 ppm chlorine and 8 ppm chlorine. Reticulated aquatic polyurethane foam was obtained from Dott Products (Avon, Ohio). The foam included 30 pores per square inch and was obtained in the form of ¾ inch cubes.

Pretreatment

Before first use, the growth medium was charged with an aqueous nutrient solution by soaking to harden the fibers and achieve stable, consistent pH as follows: A first 40 gallon plastic tote was filled with water and aliquots of a nutrient mixture containing dolomite, potassium carbonate, fish meal, magnesium sulfate, and water soluble vitamins were mixed in to the water. During the additions, measurements were taken of electrical conductivity (EC), until an EC reading of 0.500 mS/cm was obtained. The pH was then adjusted to 5.5. A second 40 gallon tote was filled with growth medium and the water-nutrient solution was pumped from the first tote into the second tote until the growth medium was fully submerged with a covering of about one inch of the solution. The tote was allowed to stand for 24 hours to complete hydration of the medium.

Planting

After 24 hours the aqueous solution was drained from the growth medium by gravity. The medium was fluffed and loosely added to a 3 gallon pot. A small hole was made in the growth medium to receive a seedling, and a tomato plant was inserted into the hole and the sides filled in with the medium. The planted containers were placed in a nursery tray selected to retain water up to the level of the lower quarter of the pot. Water was added to a third container and a nutrient and enzyme solution prepared by the addition of aliquots of an additive mixture containing endomycorrhizal fungi, soluble humic acids, soluble sea kelp, yucca plant extract, *Trichoderma* fungus, bacteria of the genus *Bacillus*, *Pseudomonas*, and *Streptomyces* to the nutrient solution and mixed in as previously described to form a nutrient solution until the EC measured 0.800 mS/cm. The pH was adjusted to 5.6.

One liter of the solution was applied to each plant by pouring around the main stem to encourage the roots to follow the water to the bottom of the container. No additional watering water was applied for the next 5 days.

Flood and Drain Watering

Five days after planting the tray was flooded with sufficient nutrient solution to cover the lower 25% of the height of the medium in the container. Once this level was reached, the nutrient solution was drained back into the reservoir without standing in the tray. The pH and EC of the returned solution in the reservoir was checked and adjusted. In preferred forms, the pH and EC of the return solution will be very close to the original values. If the EC is elevated, adjustments are made to lower EC in the reservoir solution. If the EC is less than the pre-flood value, adjustments are made to increase EC in the reservoir solution. A log or nutrient schedule is maintained. If necessary, pH can be adjusted in the same manner. After 3 days, the flooding procedure was repeated. The reservoir was refilled as needed and EC and pH were adjusted to the flat schedule of pH 5.6 with an EC of 1.000. Flooding was repeated every 3 days, about 1 hour after grow lights switched on. The containers were never permitted to dry out completely.

Advantageously, the plant growth system is lighter in weight, produces faster growth and higher yields, maintains a cleaner growth environment, the medium works better with use, establishes complete control of pH and EC at every watering event, eliminates sanitation problems in plumbing, clogged drip heads and drip lines. The system also eliminates waste and is easy to use with "Sea of Green" production techniques. The growth system is cost efficient because the growth medium is reusable and requires no disposal of soil or other growth medium, reduces water usage up to 3000 percent and eliminates waste water.

It is to be understood that while certain forms of the plant growth system and medium have been illustrated and described herein, this disclosure is not to be limited to the specific forms or arrangement of parts described and shown.

What is claimed is:

1. A method for enhancing plant growth in a plant growth medium, comprising the steps of:
   a. preparing a plant growth medium including quantities of man-made mineral fiber interspersed substantially uniformly with pieces of a reticulated foam material, wherein the plant growth medium includes from 40% to 99.5% man-made mineral fiber by weight and from 0.5% to 60% foam material pieces by weight, and wherein the foam material includes from 5 to 50 pores per square inch;
   b. adding quantities of plant nutrients, fungus, and bacteria to a quantity of water to form a plant nutrient solution having an electrical conductivity of 0.500 mS/cm to 3.500 mS/cm, and adjusting the pH to between 4.0 and 8.0;
   c. pretreating the plant growth medium by submersion in the plant nutrient solution for at least 24 hours;
   d. draining excess nutrient solution from the plant growth medium to a reservoir and adjusting the electrical conductivity to between 0.500 mS/cm and 3.500 mS/cm and adjusting the pH to between 4.0 and 8.0;
   e. planting a cutting or seedling in a container including a quantity of the plant growth medium;
   f. applying a quantity of the plant nutrient solution to the plant stem sufficient to drain from the container;
   g. waiting a period of time for the solution to be absorbed by the plant;
   h. flooding a portion of the pot from below with a quantity of the nutrient solution, and allowing the nutrient solution to drain into a reservoir;
   i. adjusting the electrical conductivity of the reservoir solution to between 0.500 mS/cm and 3.500 mS/cm and adjusting the pH to between 4.0 and 8.0; and
   j. repeating steps (h) and (i) to repeatedly flood and drain the pot until the plant has grown to a desired size.

2. A hydroponic plant growth system, comprising:
   a. a container comprising a quantity of fluffed and loosely added plant growth medium, the plant growth medium comprising a combination of substantially uniformly interspersed slag wool fibers and reticulated foam pieces, wherein the combination comprises from 40% to 99.5% by weight slag wool and from 0.5% to 60% by weight reticulated foam material pieces; and
   b. a quantity of an aqueous plant nutrient solution comprising quantities of a fungus and a bacterium;
      wherein the container comprises fluffed and loosely added plant growth medium, and wherein the foam material includes from 5 to 50 pores per square inch, and the plant nutrient solution has an electrical conductivity of from 0.500 mS/cm to 3.500 mS/cm and a pH of from 4.0 to 8.0, and wherein the slag wool comprises no added binder to hold and retain water.

3. The hydroponic plant growth system of claim 2, wherein the plant growth system comprises a combination of 90% slag wool and 10% reticulated foam material.

4. The hydroponic plant growth system of claim 2, wherein the foam material further comprises polyurethane.

5. The hydroponic plant growth system of claim 2, wherein the foam pieces further comprise ¾ inch cubes.

6. The hydroponic plant growth system of claim 2, wherein the electrical conductivity of the plant nutrient solution is from 0.500 mS/cm to 2.500 mS/cm.

7. The hydroponic plant growth system of claim 2, wherein the electrical conductivity of the plant nutrient in the plant nutrient solution is from 1.000 mS/cm to 1.200 mS/cm.

8. The hydroponic plant growth system of claim 2, wherein the pH of the plant nutrient solution is from 5.5 to 6.0.

9. The hydroponic plant growth system of claim 2, wherein the fungus is an endomycorrhizal fungus.

10. The hydroponic plant growth system of claim 2, wherein the fungus is an ectomycorrhizal fungus.

11. The hydroponic plant growth system of claim 2, wherein the fungus is of the genus *Trichoderma*.

12. The hydroponic plant growth system of claim 2, wherein the bacterium are of the genus *Bacillus*.

13. The hydroponic plant growth system of claim 2, wherein the bacterium are of the genus *Paenibacillus*.

14. The hydroponic plant growth system of claim 2, wherein the bacterium are of the genus *Pseudomonas*.

15. The hydroponic plant growth system of claim 2, wherein the bacterium are of the genus *Streptomyces*.

16. The hydroponic plant growth system of claim 2, wherein the plant growth system further includes a quantity of an inorganic compound selected from the group consisting of: ammonium nitrate, ammonium sulfate, potassium chloride, monocalcium phosphate, and magnesium sulfate, or mixtures thereof.

17. The hydroponic plant growth system of claim 2, wherein the plant growth system further includes a quantity of an organic composition selected from the group consisting of: alfalfa, ash, blood meal, bone meal, compost, a cover crop, fish emulsion, fish meal, manure, rock phosphate, raw langbeinite, rockdust, unprocessed natural potassium sulfate, wood chips, and sawdust.

* * * * *